United States Patent
Randall et al.

(10) Patent No.: US 8,767,130 B2
(45) Date of Patent: Jul. 1, 2014

(54) METHOD AND APPARATUS FOR ASSISTING USERS WITH CHANNEL ENTRY

(75) Inventors: Darrell Wayne Randall, Danville, IN (US); Michael Joseph McLane, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 550 days.

(21) Appl. No.: 12/450,059

(22) PCT Filed: Mar. 26, 2007

(86) PCT No.: PCT/US2007/007456
§ 371 (c)(1),
(2), (4) Date: Sep. 9, 2009

(87) PCT Pub. No.: WO2008/118117
PCT Pub. Date: Oct. 2, 2008

(65) Prior Publication Data
US 2010/0020249 A1    Jan. 28, 2010

(51) Int. Cl.
*H04N 5/50*    (2006.01)

(52) U.S. Cl.
USPC ........... 348/731; 348/732; 348/734; 348/725; 348/723; 348/523; 348/563; 348/564; 348/567; 348/569; 348/570; 348/247; 348/231.1; 348/231.3; 375/240.25

(58) Field of Classification Search
USPC ......... 348/569, 570, 734, 731, 732, 725, 723, 348/523, 563, 564, 567, 231.1, 231.3, 247; 725/57, 37, 38, 39, 40, 56, 100, 131, 725/139, 151; 375/240.25
See application file for complete search history.

(56) References Cited

U.S. PATENT DOCUMENTS

| | | | | |
|---|---|---|---|---|
| 4,821,122 A | * | 4/1989 | Teskey | 348/706 |
| 6,215,531 B1 | * | 4/2001 | Beery | 348/734 |
| 6,766,526 B1 | * | 7/2004 | Ellis | 725/57 |
| 6,833,878 B2 | | 12/2004 | Takagi et al. | |
| 7,525,603 B2 | * | 4/2009 | Onomatsu | 348/732 |
| 2002/0104103 A1 | | 8/2002 | Takagi et al. | |

(Continued)

FOREIGN PATENT DOCUMENTS

| | | |
|---|---|---|
| EP | 1 519 572 A2 | 3/2005 |
| EP | 1624689 | 2/2006 |

(Continued)

OTHER PUBLICATIONS

International Search Report, dated Aug. 30, 2007.

*Primary Examiner* — Jefferey Harold
*Assistant Examiner* — Mustafizur Rahman
(74) *Attorney, Agent, or Firm* — Robert D. Shedd; Reitseng Lin

(57) ABSTRACT

A method for assisting users with channel entry utilizes channel tuning history to simplify the channel entry process. According to an exemplary embodiment, the method includes steps of storing a list of channel numbers previously tuned by the apparatus; receiving a first input selecting a most significant digit of a channel number; and enabling a display of channel numbers in response to the first input, wherein the displayed channel numbers comprise at least one channel number included in the stored list and having the most significant digit and at least one other channel number not included in the stored list and having the most significant digit.

16 Claims, 3 Drawing Sheets

(56) References Cited

U.S. PATENT DOCUMENTS

| | | |
|---|---|---|
| 2003/0137605 A1 | 7/2003 | Chin et al. |
| 2004/0179138 A1* | 9/2004 | Wang et al. ............... 348/569 |
| 2005/0163225 A1* | 7/2005 | Im et al. ............... 375/240.25 |
| 2006/0218499 A1 | 9/2006 | Matthews et al. |
| 2006/0225092 A1 | 10/2006 | Takagi et al. |
| 2007/0146551 A1* | 6/2007 | O'Neil ........................ 348/731 |

FOREIGN PATENT DOCUMENTS

| | | |
|---|---|---|
| GB | 2 409 360 A | 6/2005 |
| JP | 2002246881 | 8/2002 |
| JP | 2003-152504 | 5/2003 |
| JP | 2003-153102 | 5/2003 |
| JP | 2003-333358 | 11/2003 |
| JP | 2004-336312 | 11/2004 |
| JP | 2004-343345 A | 12/2004 |
| JP | 2006-180118 | 7/2006 |
| JP | 2006254076 | 9/2006 |
| JP | 2006-340052 | 12/2006 |
| KR | 10-2006-0089720 A | 8/2006 |
| WO | WO03/092270 | 11/2003 |
| WO | 2005-015900 A1 | 2/2005 |
| WO | WO2005067283 | 7/2005 |

* cited by examiner

METHOD AND APPARATUS FOR ASSISTING USERS WITH CHANNEL ENTRY

This application claims the benefit, under 35 U.S.C. §365 of International Application PCT/US2007/007456, filed Mar. 26, 2007 which was published in accordance with PCT Article 21(2) on Oct. 2, 2008 in English.

BACKGROUND OF THE INVENTION

1. Field of the Invention

The present invention generally relates to a channel entry technique for an apparatus such as a television signal receiver, and more particularly, to a method and apparatus for assisting users with channel entry that, among other things, utilizes channel tuning history to simplify the channel entry process.

2. Background Information

In current products, such as certain television signal receivers, variable length major and/or minor channel numbers may be entered by a user. A major channel number may for example consist of up to four digits, while a minor channel number may for example consist of up to three digits. These properties may result in the user being required to enter a relatively large number of keystrokes in order to enter a single channel number (e.g. to change channels via direct channel entry). Since this is a common operation in many consumer electronic products, reducing the number of keystrokes required for the channel entry process would enhance the user experience.

One approach for reducing the number of keystrokes required for the channel entry process involves using a channel number completion algorithm that exploits knowledge of valid channel numbers (i.e., those channel numbers which are properly tunable). According to one such conventional algorithm, a user channel entry is accepted as complete when it is a unique and complete representation of an available channel. The rules for channel entry according to this conventional algorithm are as follows.

First, there are a maximum number of digits for the major and minor channel numbers (e.g., four digits for the major channel number, three digits for the minor channel number). Entry of the major channel number is complete when: (i) the maximum number of digits has been entered, (ii) the user presses a predetermined key indicating completion (e.g., ENTER, OK, etc.) or a minor channel number delimiter key (e.g., DASH, right arrow, etc.), or (iii) the entered number is a unique and complete representation of a channel number currently available. When entry of the major channel number is complete, a check is performed to determine if there are any minor channel numbers associated with the entered major channel number. If not, then the entry is taken as complete. If so, then entry of the minor channel number is initiated.

Also according to this conventional algorithm, the channel entry process will "time out" if no entry is made for a predetermined time period (e.g., five seconds, etc.), in which case the partial entry is accepted as complete. A partial entry is considered a unique and complete representation of the major channel number if: (i) there is a channel whose major channel number has the same number of digits as have already been entered by the user and that major channel number identically matches the entered digits, or (ii) any further digit entry could not result in a match to any available channel. For example, if four digits are permitted, and channel numbers 102 and 1024 are available, then entry of the digits 1-0-2 would not result in a unique entry, and would therefore not be accepted as complete.

While the foregoing conventional algorithm simplifies the channel entry process to some extent, the present inventors recognize that it can be simplified even further. The present invention described herein provides a method and apparatus for assisting users with channel entry that, among other things, utilizes channel tuning history to simplify the channel entry process.

SUMMARY OF THE INVENTION

In accordance with an aspect of the present invention, a method for assisting users with entering channel numbers in an apparatus is disclosed. According to an exemplary embodiment, the method comprises storing a list of channel numbers previously tuned by the apparatus; receiving a first input selecting a most significant digit of a channel number; and enabling a display of channel numbers in response to the first input, wherein the displayed channel numbers comprise at least one channel number included in the stored list and having the most significant digit and at least one other channel number not included in the stored list and having the most significant digit.

In accordance with another aspect of the present invention, an apparatus capable of assisting users with entering channel numbers is disclosed. According to an exemplary embodiment, the apparatus comprises first means such as a memory for storing a list of channel numbers previously tuned by the apparatus, and second means such as a processor for enabling a display of channel numbers in response to a first input selecting a most significant digit of a channel number. The displayed channel numbers comprise at least one channel number included in the stored list and having the most significant digit and at least one other channel number not included in the stored list and having the most significant digit.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
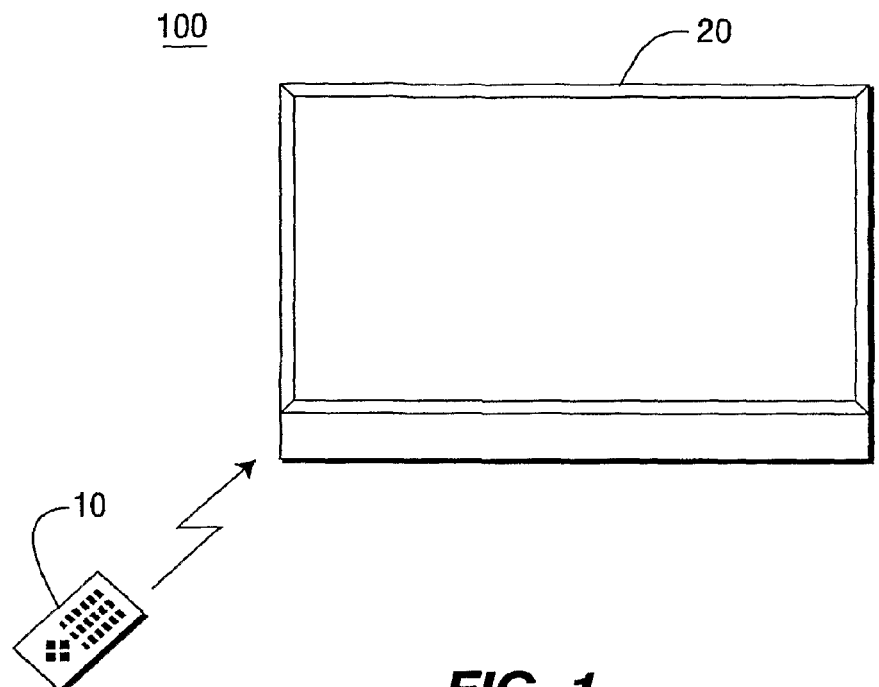
FIG. 1 is an exemplary environment suitable for implementing the present invention.

Referring now to the drawings, and more particularly to FIG. 1, an exemplary environment 100 suitable for implementing the present invention is shown. As indicated in FIG. 1, environment 100 comprises user input means such as user input device 10, and electronic apparatus such as apparatus 20. According to an exemplary embodiment, apparatus 20 is embodied as a television signal receiver, but may be embodied as any type of device or apparatus that includes a channel entry feature.

User input device 10 is operative to generate and output control signals that control the operation of apparatus 20 and/or other devices. According to an exemplary embodiment, user input device 10 includes a plurality of input keys and outputs control signals in a wired and/or wireless (e.g., via infrared or radio frequency (RF) link, etc.) manner responsive to user depression of its input keys. User input device 10 may for example be embodied as a hand-held remote control device, wired and/or wireless keyboard, integrated control panel of apparatus 20, and/or other user input device.

Apparatus 20 is operative to receive signals including audio, video and/or data signals in analog and/or digital format from one or more signal sources such as terrestrial, cable, satellite, internet and/or other signal sources and to provide aural and/or visual outputs corresponding to these received signals. Apparatus 20 is also operative to process received signals and provide the resulting processed signals to one or more other devices, and to receive signals from other devices. According to an exemplary embodiment, apparatus 20 performs a channel entry technique that assists users with the channel entry process. Further details regarding the aforementioned channel entry technique of apparatus 20 will be provided later herein.

Figure 2:
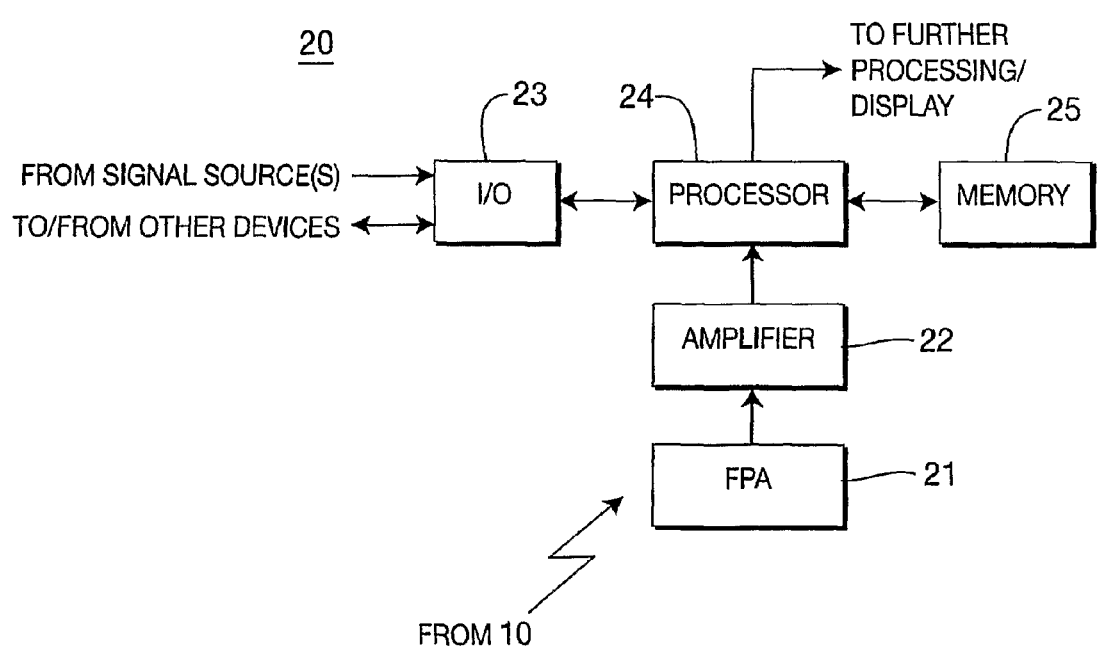
FIG. 2 is a block diagram providing further details of the apparatus of FIG. 1 according to an exemplary embodiment of the present invention.

Referring to FIG. 2, a block diagram providing further details of apparatus 20 of FIG. 1 according to an exemplary embodiment of the present invention is shown. Apparatus 20 of FIG. 2 comprises front panel means such as front panel assembly (FPA) 21, coupling means such as amplifier 22, and input/output (I/O) means such as I/O block 23, processing means such as processor 24, and memory means such as memory 25. Some of the foregoing elements of FIG. 2 may be embodied using one or more integrated circuits (ICs). For clarity of description, certain conventional elements associated with apparatus 20 such as certain control signals, power signals and/or other elements may not be shown in FIG. 2.

FPA 21 is operative to receive user inputs from user input device 10, and to output signals corresponding to the user inputs to amplifier 22. According to an exemplary embodiment, FPA 21 receives signals, such as infrared (IR) and/or radio frequency (RF) signals, from user input device 10 and generates corresponding signals which are output to amplifier 22. Amplifier 22 is operative to amplify the signals provided from FPA 21 for output to processor 24.

I/O block 23 is operative to perform I/O functions of apparatus 20. According to an exemplary embodiment, I/O block 23 is operative to receive signals such as audio, video and/or data signals in analog and/or digital format from one or more signal sources such as terrestrial, cable, satellite, internet and/or other signal sources. I/O block 23 is also operative to output processed signals to one or more other devices, and to receive signals from such devices.

Processor 24 is operative to perform various signal processing and control functions of apparatus 20. According to an exemplary embodiment, processor 24 processes the audio, video and/or data signals provided from I/O block 23 by performing functions including tuning, demodulation, forward error correction, and transport processing functions to thereby generate digital data representing audio, video and/or data content. The digital data produced from such processing functions may be provided for further processing and/or output.

Processor 24 is also operative to execute software code for enabling a channel entry technique that assists users with the channel entry process according to principles of the present invention. Further details regarding processor 24 and the aforementioned channel entry technique of the present invention will be provided later herein. Processor 24 is also operative to perform and/or enable other functions of apparatus 20 including, but not limited to, processing other user inputs made via user input device 10, reading and writing data from and to memory 25, and/or other operations.

Memory 25 is operatively coupled to processor 24 and performs data storage functions of apparatus 20. Memory 25 may be implemented using one or more individual memory modules (e.g., ICs, etc.). According to an exemplary embodiment, memory 25 stores data including, but not limited to, software code, on-screen display (e.g., menu, etc.) data, data representing a channel list of previously tuned channel numbers for assisting users with channel entry, user setup data, and/or other data.

Figure 3:
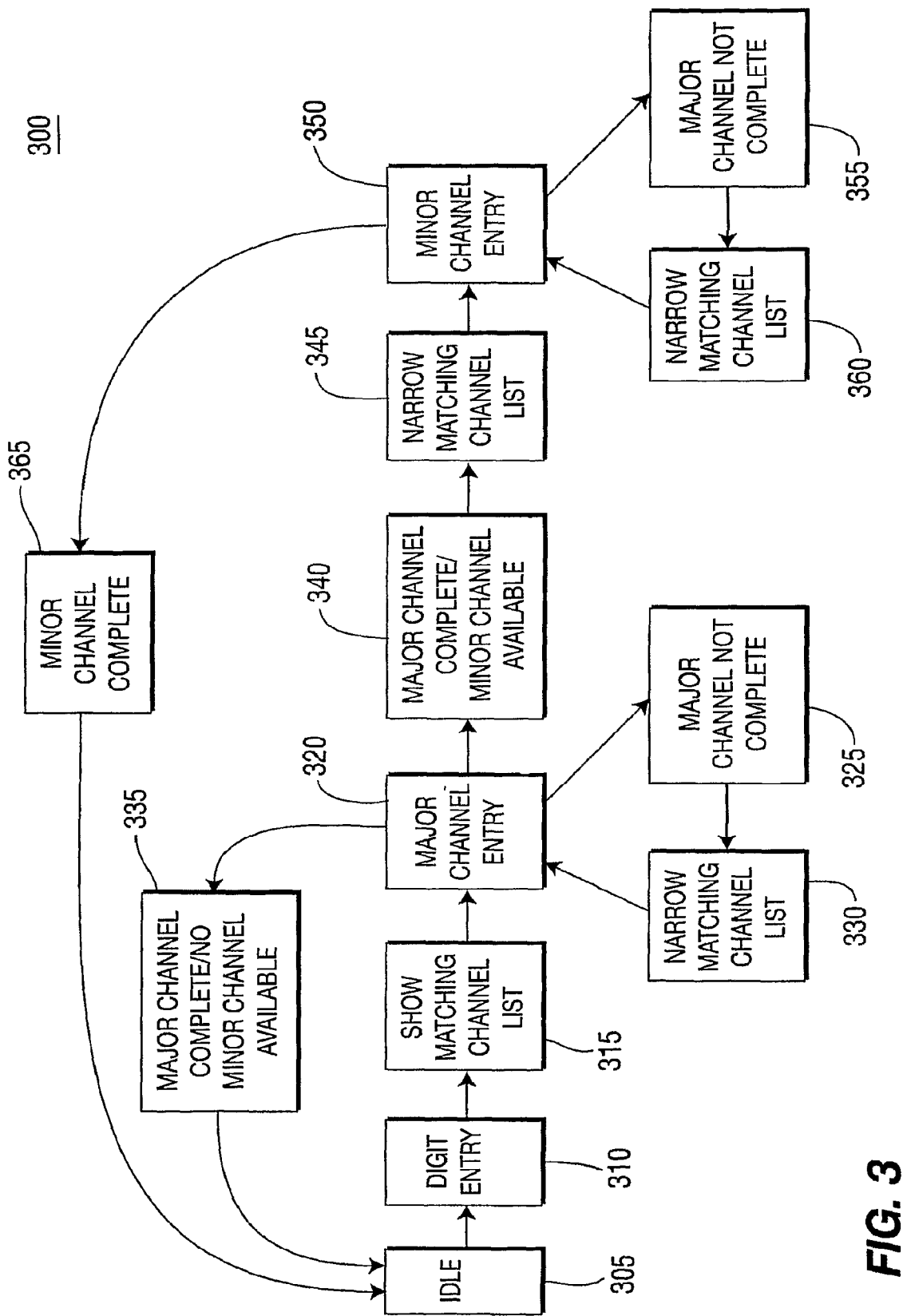
FIG. 3 is a transition diagram illustrating a channel entry technique according to an exemplary embodiment of the present invention.

Referring now to FIG. 3, a transition diagram 300 illustrating a channel entry technique according to an exemplary embodiment of the present invention is shown. For purposes of example and explanation, FIG. 3 will be described with specific reference to apparatus 20 of FIGS. 1 and 2. According to an exemplary embodiment, a software algorithm executed by processor 24 has already caused an ordered list of previously tuned channel numbers to be created and stored in memory 25 at the time the channel entry technique of FIG. 3 begins. However, the channel entry technique of FIG. 3 may also apply to situations where apparatus 20 has just begun use, in which case the channel list in memory 25 is gradually populated with channel numbers as they are tuned by apparatus 20. The channel list in memory 25 could also be prepopulated with a list of predetermined channel numbers at the time of manufacture of apparatus 20. This list of predetermined channel numbers could then be replaced with new channel numbers as they are tuned by apparatus 20.

According to principles of the present invention, the channel list in memory 25 is created such that certain channel numbers have a higher weighting (or priority) than other channel numbers. This weighting determines the relative position in which channel numbers are arranged in the channel list in memory 25. According to an exemplary embodiment, a higher weighting causes a channel number to be placed at a higher position in the channel list in memory 25. A channel number's position in the channel list in memory 25 also corresponds to the order in which it is displayed in channel lists for users.

According to an exemplary embodiment, the software algorithm executed by processor 24 may give extra weighting to recently tuned channels so that channels that have been tuned frequently in the past, but not tuned recently, may be dropped in weighting, while more recently tuned channels may receive higher weighting. The determination of what constitutes a "recently" tuned channel may be established as a matter of design choice. In order to avoid adding all channel numbers to the channel list in memory 25 as users "surf" through various channels, a channel number may be added to the channel list only after it has been tuned for a predetermined period of time, which may be set in accordance with design choice. Other types of weighting or priority systems may also be employed to create the channel list in memory 25 according to the present invention.

At block 305 of FIG. 3, an idle state for the channel entry technique exists. At block 310, a user initiates a direct digit channel number entry via user input device 10. According to an exemplary embodiment, the digit entered at block 310 is the first or most significant digit of a major channel number. In response to the digit entry at block 310, processor 24 causes a matching channel list to be displayed (e.g. as a drop-down menu, etc.) at block 315. According to an exemplary embodiment, the matching channel list displayed at block 315 shows the most recently tuned channel numbers that include the most significant digit of the major channel number entered at block 310. In this manner, the matching channel list displayed at block 315 shows recently tuned channel numbers that could be valid completions of the partial channel number entry made at block 310. If not enough recently tuned channel numbers are available, then matching channel numbers (i.e., those including the most significant digit) may be added to the displayed channel list from a list of all valid channel numbers established, for example, during a set-up process in which apparatus 20 scans all channels to thereby identify valid channel numbers. Accordingly, in its most general sense, the matching channel list displayed at block 315 may comprise at least one channel number stored in the channel list of memory 25 that includes the most significant digit of the major channel number, and at least one other channel number not stored in the channel list of memory 25 that also includes the most significant digit.

In one embodiment, the displayed channels stored in memory 25 are arranged according to recently accessed time with the most recently accessed channel number displayed first, and the displayed channels not stored in memory 25 are arranged in either ascending or descending order.

Figure 4:
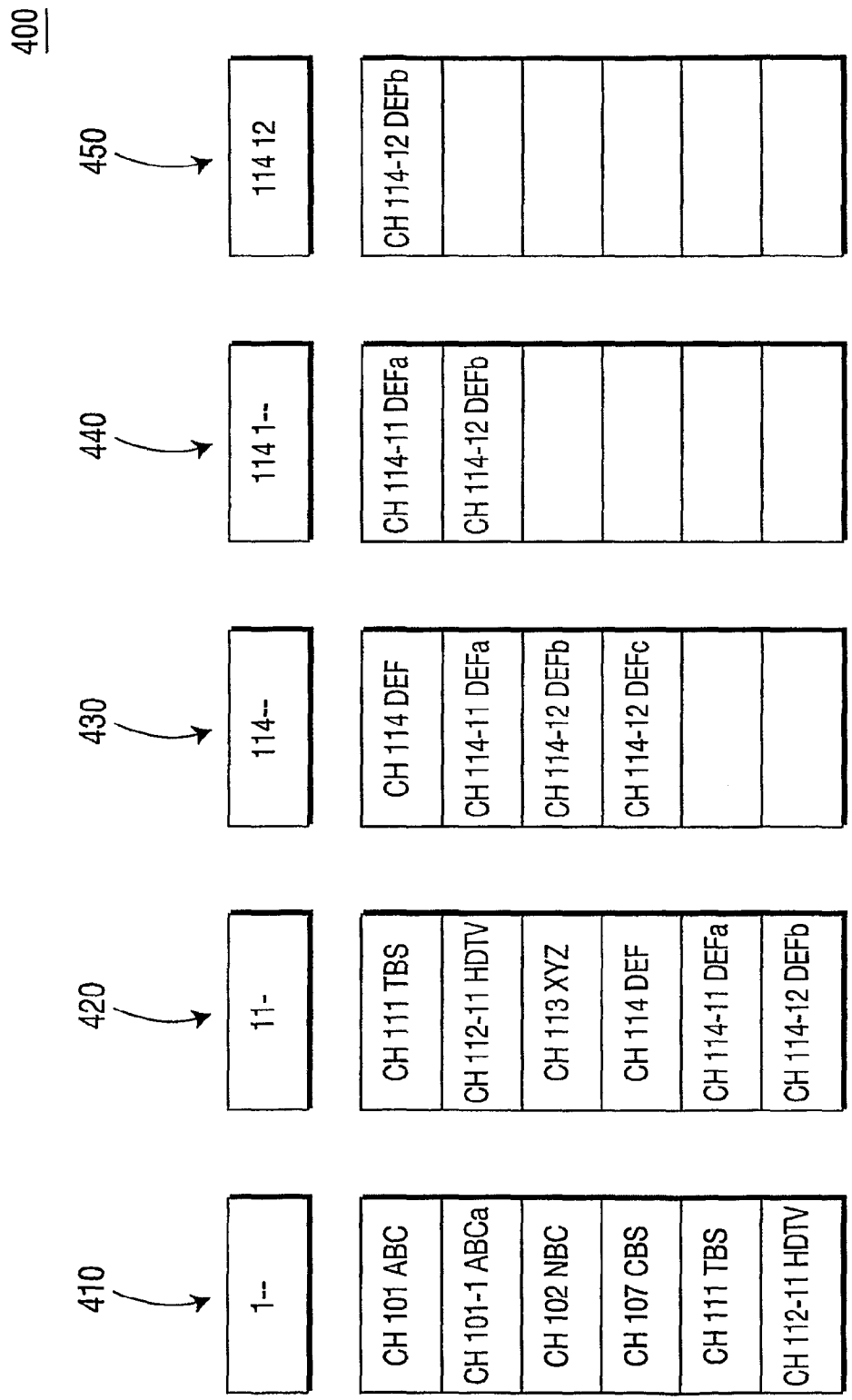
FIG. 4 is a diagram illustrating a number of channel lists according to an exemplary embodiment of the present invention.

Channel list 410 of FIG. 4 is an example of the matching channel list that may be displayed at block 315 of FIG. 3 in response to the user entering the digit "1" as the most significant digit of the major channel number at block 310. As indicated in FIG. 4, a highlight may be displayed on channel list 410 and the user can navigate up and down channel list 410 via user input device 10 to thereby select a desired channel number for tuning. For example, the user may select a currently highlighted channel number for tuning by pressing a predetermined key (e.g., SELECT, etc.) of user input device 10. According to the present invention, users may highlight and select a channel number for tuning in this manner at any time while a matching channel list is displayed, thereby assisting them with the channel entry process. According to an exemplary embodiment, the highlight may be initially placed on the most highly weighted channel number as determined by the applicable software algorithm. This type of initial highlight placement may be used for all displayed channel lists.

From block 315, process flow advances to block 320 where entry of a major channel number continues and a user may enter a next digit of the major channel number. In response to the digit entry at block 320, and a determination by processor 24 that entry of the major channel number is not complete at block 325, processor 24 then causes a narrowed matching channel list to be displayed (e.g. as a drop-down menu, etc.) at block 330. According to an exemplary embodiment, the narrowed matching channel list displayed at block 330 shows all channel numbers matching the digit entry made at block 320 with the matching channel numbers stored in the channel list of memory 25 (e.g., the "recently tuned" list) displayed first in the list, followed by matching channel numbers from the list of all valid channel numbers (if the channel list in memory 25 is not full). When there are no available matching channel numbers, the channel list may be hidden.

Channel list 420 of FIG. 4 is an example of the narrowed matching channel list that may be displayed at block 330 of FIG. 3 in response to the user entering the digit "1" as the second most significant digit of the major channel number at block 320. As indicated in FIG. 3, blocks 320 through 330 may be repeatedly performed until entry of the major channel number is complete. According to an exemplary embodiment, the major channel number consists of three digits, although a different number of digits may be used in practice. Accordingly, the user may enter a third most significant digit of the major channel number at step 320. In response to this third digit entry at block 320, processor 24 may then determine that entry of the major channel number is complete and that at least one associated minor channel is available at block 340. In this case, processor 24 causes a more narrowed matching channel list to be displayed (e.g. as a drop-down menu, etc.) at block 345. Alternatively, processor 24 may determine that entry of the major channel number is complete, but that no associated minor channel is available at block 335. In this case, the channel entry technique goes back the idle state at block 305.

According to an exemplary embodiment, the more narrowed matching channel list displayed at block 345 shows all channel numbers matching the third digit entry made at block 320, again with the matching channel numbers stored in the channel list of memory 25 (e.g., the "recently tuned" list) displayed first in the list, followed by matching channel numbers from the list of all valid channel numbers (if the channel list in memory 25 is not full). When there are no available matching channel numbers, the channel list may be hidden.

Channel list 430 of FIG. 4 is an example of the more narrowed matching channel list that may be displayed at block 345 of FIG. 3 in response to the user entering the digit "4" as the third most significant digit of the major channel number at block 320. From block 345, process flow advances to block 350 where minor channel number entry begins and a user may enter a first most significant digit of the minor channel number. In response to the digit entry at block 350, and a determination by processor 24 that entry of the minor channel number is not complete at block 355, processor 24 causes a further narrowed matching channel list to be displayed (e.g. as a drop-down menu, etc.) at block 360. According to an exemplary embodiment, the further narrowed matching channel list displayed at block 360 shows all channel numbers matching the digit entry made at block 350, again with the matching channel numbers stored in the channel list of memory 25 (e.g., the "recently tuned" list) displayed first in the list, followed by matching channel numbers from the list of all valid channel numbers (if the channel list in memory 25 is not full). When there are no available matching channel numbers, the channel list may be hidden.

Channel list 440 of FIG. 4 is an example of the further narrowed matching channel list that may be displayed at block 360 of FIG. 3 in response to the user entering the digit "1" as the first most significant digit of the minor channel number at block 350. As indicated in FIG. 3, blocks 350 through 360 may be repeatedly performed until entry of the minor channel number is complete. According to an exemplary embodiment, the minor channel number consists of two digits, although a different number of digits may be used in practice. Accordingly, the user may enter a second most significant digit of the minor channel number at step 350. In response to this second digit entry at block 350, processor 24 causes an even further narrowed matching channel list to be displayed (e.g. as a drop-down menu, etc.) at block 360. According to an exemplary embodiment, this even further narrowed matching channel list displayed at block 360 shows all channel numbers matching the second digit entry made at block 350, again with the matching channel numbers stored in the channel list of memory 25 (e.g., the "recently tuned" list) displayed first in the list, followed by matching channel numbers from the list of all valid channel numbers (if the channel list in memory 25 is not full). When there are no available matching channel numbers, the channel list may be hidden.

Channel list 450 of FIG. 4 is an example of the even further narrowed matching channel list that may be displayed at block 360 of FIG. 3 in response to the user entering the digit "2" as the second most significant digit of the minor channel number at block 350. Once processor 24 determines that entry of the minor channel number is complete at block 365, the channel entry technique goes back the idle state at block 305. As previously indicated herein, users may highlight and select a channel number for tuning at any time while a matching channel list is displayed, thereby assisting them with the channel entry process.

As described herein, the present invention provides a method and apparatus for assisting users with channel entry that utilizes channel tuning history to simplify the channel entry process. The present invention may be applicable to various apparatuses, either with or without an integrated display device. Accordingly, the terms "apparatus" and "television signal receiver" as used herein may refer to systems or apparatuses including, but not limited to, television sets, computers or monitors that include an integrated display device, and systems or apparatuses such as set-top boxes, video cassette recorders (VCRs), digital versatile disk (DVD) players, video game boxes, personal video recorders (PVRs), computers or other apparatuses that may not include an integrated display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for assisting users with entering channel numbers in an apparatus, said method comprising:
    performing a channel scanning process to identify one or more valid channel numbers for said apparatus;
    storing, in a memory of said apparatus, a list of channel numbers previously tuned by said apparatus for at least a predetermined period of time;
    receiving a first input selecting a most significant digit of a channel number; and
    enabling a display of complete channel numbers in response to said first input, wherein said displayed channel numbers are simultaneously displayed and comprise:
    at least one complete channel number included in said stored list and having said most significant digit; and
    at least one other complete channel number not included in said stored list but identified during said channel scanning process as a valid channel number for said apparatus and also having said most significant digit.

2. The method of claim 1, further comprising:
    receiving a second input selecting one of said displayed channel numbers; and
    tuning said selected channel number in response to said second input.

3. The method of claim 1, wherein at least one of said displayed channel numbers is a digital channel number.

4. The method of claim 3, wherein said digital channel number includes a major channel number and a minor channel number.

5. The method of claim 1, wherein at least two of said displayed channel numbers are arranged in an order according to most recently tuned time.

6. The method of claim 5, wherein one of said displayed channel numbers was most recently tuned and is displayed in a first position.

7. The method of claim 6, wherein other said displayed channel numbers are arranged in ascending order following said first position.

8. The method of claim 1, wherein said at least one complete channel number included in said stored list and having said most significant digit is presented in said display before said at least one other complete channel number not included in said stored list and having said most significant digit.

9. An apparatus for assisting users with entering channel numbers, comprising:
    a memory operative to store a list of channel numbers previously tuned by said apparatus for at least a predetermined period of time; and
    a processor operative to enable a display of complete channel numbers in response to a first input selecting a most significant digit of a channel number, wherein said displayed channel numbers are simultaneously displayed and comprise:
    at least one complete channel number included in said stored list and having said most significant digit; and
    at least one other complete channel number not included in said stored list but identified during a channel scanning process of said apparatus as a valid channel number for said apparatus, and also having said most significant digit.

10. The apparatus of claim 9, wherein said processor receives a second input selecting one of said displayed channel numbers and causes said selected channel number to be tuned in response to said second input.

11. The apparatus of claim 9, wherein at least one of said displayed channel numbers is a digital channel number.

12. The apparatus of claim 11, wherein said digital channel number includes a major channel number and a minor channel number.

13. The apparatus of claim 9, wherein at least two of said displayed channel numbers are arranged in an order according to most recently tuned time.

14. The apparatus of claim 13, wherein one of said displayed channel numbers was most recently tuned and is displayed in a first position.

15. The apparatus of claim 14, wherein other said displayed channel numbers are arranged in ascending order following said first position.

16. The apparatus of claim 9, wherein said at least one complete channel number included in said stored list and having said most significant digit is presented in said display before said at least one other complete channel number not included in said stored list and having said most significant digit.

* * * * *